R. W. CRIPPEN.
THRESHING MACHINE.
APPLICATION FILED JAN. 11, 1912.
1,050,206.
Patented Jan. 14, 1913.
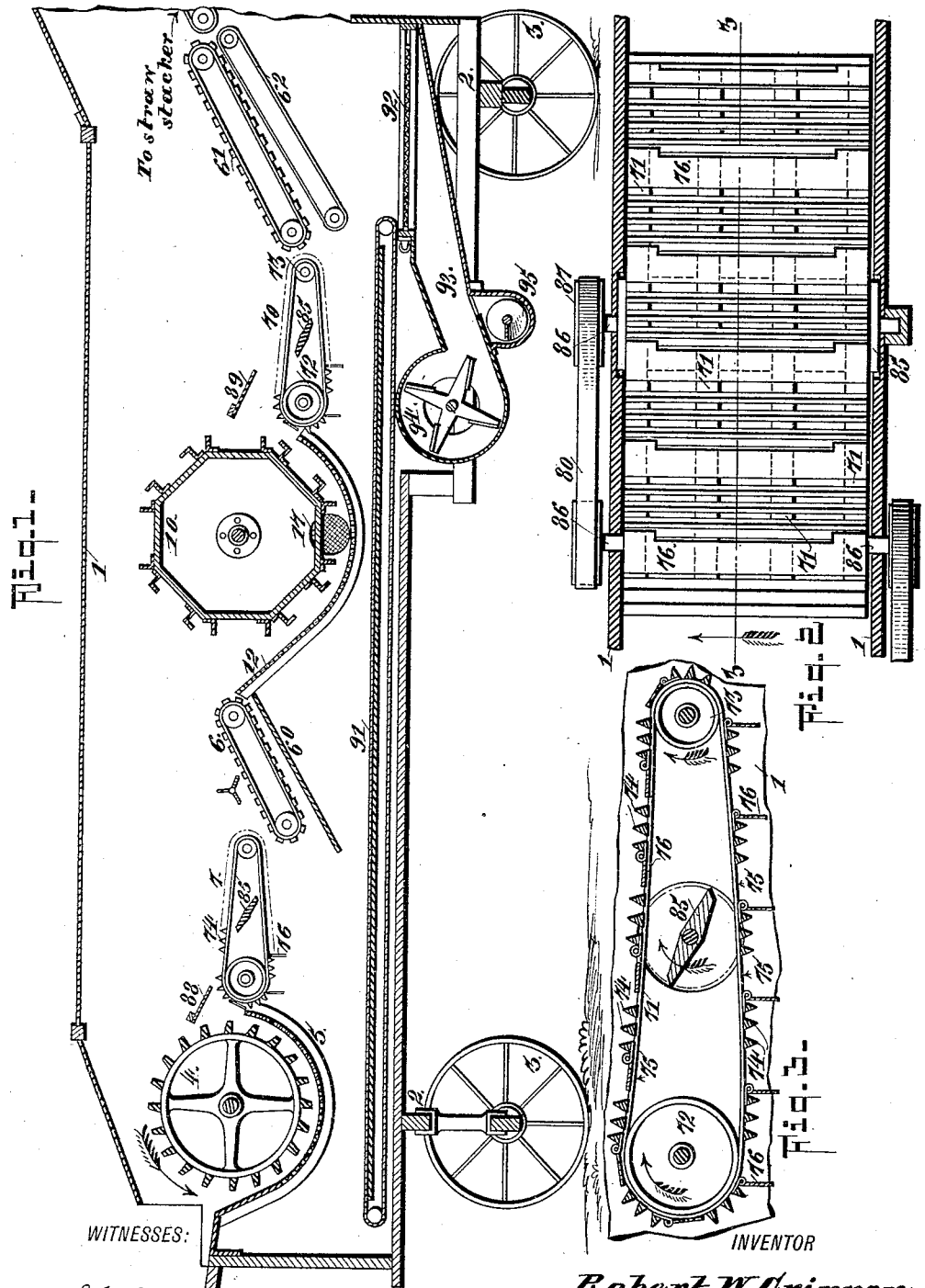
WITNESSES:
John T. Schrott
R. Grunwell
INVENTOR
Robert W. Crippen
BY
Fred G. Dieterich & Co.
ATTORNEYS.

UNITED STATES PATENT OFFICE.

ROBERT W. CRIPPEN, OF ARLINGTON, KANSAS.

THRESHING-MACHINE.

1,050,206. Specification of Letters Patent. Patented Jan. 14, 1913.

Application filed January 11, 1912. Serial No. 670,589.

*To all whom it may concern:*

Be it known that I, ROBERT W. CRIPPEN, a citizen of the United States, residing at Arlington, in the county of Reno and State of Kansas, have invented a new and Improved Threshing-Machine, of which the following is a specification.

This invention, which in its general nature relates to threshing machines more particularly comprehends certain improvements on the means for effecting the separation of the straw chaff and other extraneous matter from the grain, such as is disclosed in my Patent No. 931,731, dated August 24, 1909.

In my patent referred to, the separation of the grain from the straw, chaff and other extraneous matter is largely effected by beater devices that coact with endless carrier belts that convey the straw from the first cylinder to a beater drum or compounder, and other like devices which the partially separated grain engages as it passes off to the discharge and blower devices.

In my present invention, I have provided an improved means of which there are two sets, one for coöperating with the endless carrier that conveys the straw from the first cylinder or concave to the centrally disposed compounding drum or beater and the other for coöperating with the endless carrier that takes off the straw under final separation and delivers and discharges it from the stacking end of the machine, the said improved means each comprising a supplemental endless carrier having specially formed cross slats or teeth arranged in arbitrary series with which coöperate clearing devices that automatically operate to clear the said slats or teeth of the straw as the latter passes thereover and is conveyed thereby onto the main carrier devices as disclosed in my other patent mentioned, the constructions and arrangement of the said supplemental carriers being such whereby the operation of separating the straw and the grain is greatly facilitated, rendered positive and the capacity of my patented machine stated is materially increased.

With other objects in view that will hereinafter appear, my present invention embodies the peculiar construction and novel arrangement of the parts hereinafter fully explained, specifically pointed out in the appended claims and illustrated in the accompanying drawings, in which:—

Figure 1, is a longitudinal section of my improved construction of threshing machine. Fig. 2, is a top plan view of one of the supplemental combined endless carrier and separating means. Fig. 3, is a longitudinal section thereof on the line 3—3 on Fig. 2.

In the showing of my present invention, 1 designates the main casing, 2 the truck framing that is mounted on the wheels 3—3 and 4 the threshing cylinder that is located at the infeed end of the casing and 5 the concave that coöperates with the cylinder, all of which is of the conventional construction.

6 designates the first or front one of a pair of endless apron or straw carriers, which, in the present construction is located some distance to the rear of the cylinder 4 over an inclined bottom or chute 60 and at the entrant end of the concave 12 for the beater or compounding drum 10 presently again referred to, the said carrier 6 discharging onto the said concave as is clearly shown in the drawing.

7 designates the first or front set of supplemental separating devices that coöperates with the front cylinder 4 and its concave 5, and the front endless carrier, the construction of such separating devices 7 and the like rear devices 70, forming an essential feature of my present invention.

The supplemental separating devices 7 and 70 are each constructed in the manner shown in detail in Figs 2 and 3 of the drawing, by reference to which it will be seen the said device consists of a set of endless belts or bands 71 that pass over a front roller 72 of a larger diameter than a rear roller 73 over which the said bands 71 also pass.

74 designates transverse slats shaped in cross section and these are arranged in sets, preferably three each, and secured onto the said bands 71 in any approved manner.

The several sets of slats are separated to provide open spaces 75 which aid in clearing the slatted carriers of the straw and also materially assists the grain in dropping through the bottom section of the carrier, when it separates from the straw and while passing the latter from the cylinder 5 to the first endless carrier 6.

To prevent the straw and chaff dropping through the top section of the separating devices, the latter includes a series of hinged valves or plates 76 which, when on their forward movement with the bands 71 drop by gravity onto the several bands and close the spaces 75 and when on their under or return movement drop by gravity to hang pendently from the said bands, such action of the plates 70 seeming to aid in agitating the straw, and as closure members for holding the straw as it is passed forwardly in the direction of the carrier or endless apron 6.

By pivotally mounting the plates 76 as shown, the said plates positively and under automatic action, drop to the open position when passing back under the band rollers, thereby leaving the spaces 75 on the under side entirely open for the free passage therethrough of the separated grain, which drops onto the long endless band conveyer 91 mounted in the bottom of the threshing casing and discharging onto a final separating screen 92 located over the blast outlet 93 from the blower 94, the finally screened or separated grain now passing onto chute 93 that discharges into a transversely disposed auger 95 that discharges the grain through one side of the machine.

The central or beater cylinder 10 is of substantially the same construction as the like cylinder shown in my other patent before referred to and in the completed form of my present machine, the screened blast openings 17, shown in my former patent are also used.

For shaking the supplemental separating devices 7—70 a rotary knocker blade 85 is mounted transversely of and between the upper and lower sections of the slatted carriers that form a part of the said devices, and the said blade has trunnions 86 that extend through the sides of the casing 1, as is clearly shown in Fig. 2, in which one of the trunnions 86 is shown with a pulley 87 over which takes the belt 80 driven from a pulley or front pulley of the said device driven from any movable part of the machine.

As hereinbefore stated, a second set of the devices designated 70 is used that picks up the partially separated straw that passes from the beater drum,—conveys and cleans and separates the said straw, etc., as it passes to the carrier or rear endless slatted carrier 61 that conveys the separated straw to the stacking devices (not shown) the final grain droppings passing onto an endless band chute 62 and dropping onto the bottom endless conveyer and the final screening surface.

It is understood the desired motion to the several endless conveyers, the carriers and the supplemental separating devices is transmitted in any well-known manner from a driving shaft or member of the threshing machine.

In my present construction, the act of separating the grain from the straw, chaff, etc., is continuous from the time the straw strikes the first cylinder until it leaves the last endless carrier that discharges the straw through the stacking end of the machine and since the straw, in practice, is carried through the machine, under a great velocity, it follows that the continuous agitation thereof effects a quick and positive separation of the grain.

By forming the carrier at intervals, with a series of spaces and hinged plates 76 too much of the straw is prevented from being forced through the carrier without materially interfering with the separating operation as the said straw is conveyed by the carrier. Furthermore when the rattle rake or carrier members are returning on the under side, the spaces in the said rakes or carriers allow the straw that gathers between the upper and lower carrier or rake members to fall out and thereby prevents the sand and straw from wrapping around the shafts.

If desired the retarding valves 88—89 like in my patent above stated may also be utilized in my present construction, as shown.

What I claim is:—

1. In a threshing machine, a separating means, said means comprising an endless slatted carrier that conveys the straw, said carrier having one or more transverse spaces, and closure devices for said spaces that operate to close the spaces during the forward travel of the endless slatted carrier.

2. In a threshing machine, a separating means, said means comprising an endless slatted carrier that conveys the straw forwardly from the cylinder, said carrier having one or more transverse spaces, closure devices for said spaces that operate to close the spaces during the forward travel of the endless slatted carrier, and that uncover said spaces on the backward travel of the said endless slatted carrier.

3. In a threshing machine, a separating means, said means comprising an endless slatted carrier that conveys the straw, said carrier having one or more transverse spaces, closure devices for said spaces that operate to close the spaces during the forward travel of the endless slatted carrier, and that uncover said spaces on the backward travel of the said endless slatted carrier, and a rotary agitator disposed between the upper and lower sections of the said slatted carrier and that intermittently strikes the said sections.

ROBERT W. CRIPPEN.

Witnesses:
R. M. TAYLOR,
W. H. CRIPPEN.

Copies of this patent may be obtained for five cents each, by addressing the "Commissioner of Patents, Washington, D. C."